No. 677,177. Patented June 25, 1901.
R. A. CORDNER.
CLUTCH MECHANISM.
(Application filed Apr. 2, 1900.)
(No Model.)
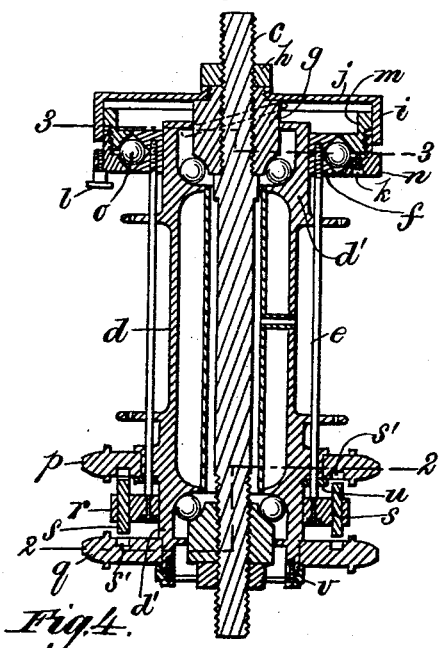
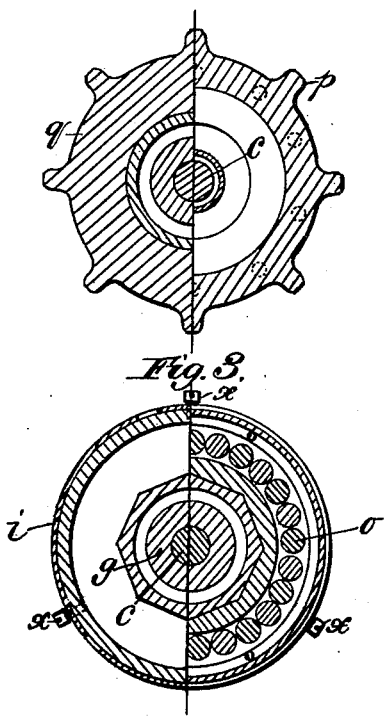
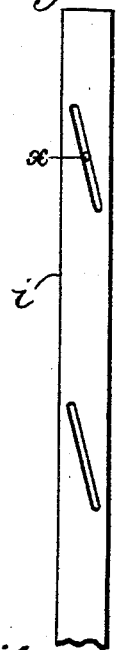
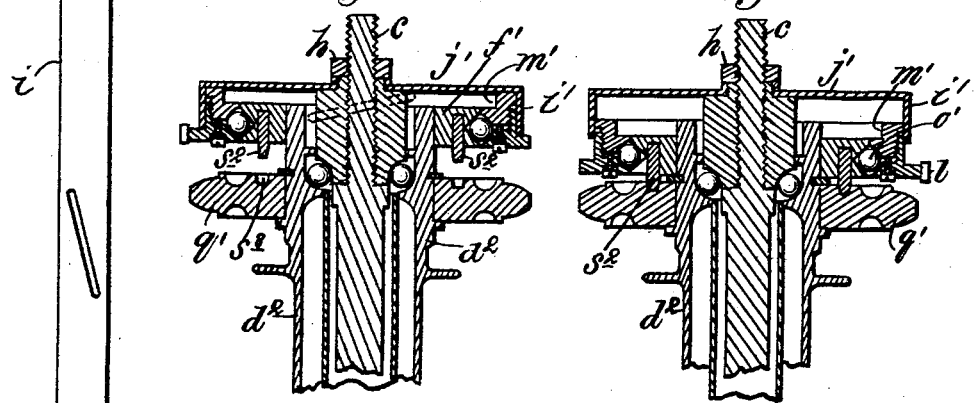
Witnesses.
Robert Emmett,
Dennis Sumby.
Inventor.
Robert A. Cordner,
By James L. Norris,
Atty.

UNITED STATES PATENT OFFICE.

ROBERT ALLEN CORDNER, OF LONDON, ENGLAND.

CLUTCH MECHANISM.

SPECIFICATION forming part of Letters Patent No. 677,177, dated June 25, 1901.

Application filed April 2, 1900. Serial No. 11,227. (No model.)

*To all whom it may concern:*

Be it known that I, ROBERT ALLEN CORDNER, a British subject, residing at 29 Alexandra road, Upper Norwood, London, England, have invented a new and useful Clutch Mechanism, (for which I have obtained a patent in Great Britain, No. 24,703, bearing date January 20, 1900,) of which the following is a specification.

This invention relates to clutch mechanism especially intended for connection with cycles, and it is of such a character that a driving member or wheel may be readily coupled to or uncoupled from the hub or shaft carrying the same or the same result may be secured with either one of a plurality of driving members or wheels.

The invention includes as one of its features a hub having a wheel or driving member freely rotative thereon, a clutch rotative with said hub for coupling said wheel thereto, a second and laterally-movable wheel rotative with the hub, means to positively move said second wheel sidewise, and means actuated by said second wheel for moving the clutch.

In the present case I provide a fixed casing having a plurality of diagonal slots and it houses a second casing freely slidable therein, said slidable casing coacting with the laterally-movable wheel above mentioned. This slidable casing has pins extending through the diagonal slots and it moves sidewise with the laterally-movable wheel, and when it is turned through suitable means it is moved outward or inward, as the case may be, through the agency of the pin-and-slot connection, thereby through the agency of suitable mechanism correspondingly operating the laterally-movable wheel. Said wheel may be connected by means of one or more rods with the clutch, though this is not essential.

The invention of course is in no wise limited to the construction hereinafter described, for many simple changes may be made fully within the scope of the appended claims.

In the drawings accompanying and forming part of this specification, Figure 1 is a longitudinal central section through the rear-wheel hub and axle, showing the hub with two driving members. Figs. 2 and 3 are transverse sections in the lines 2 2 and 3 3, respectively, Fig. 1. Fig. 4 shows a development of the flange of the fixed casing. Figs. 5 and 6 are sections corresponding to Fig. 1, but showing only a portion of the axle and hub and representing the clutch in its ineffective and effective positions, respectively, and with a single driving member.

Like characters refer to like parts in all the figures of the drawings.

Referring to Fig. 1, two sprocket-wheels are shown at $p$ and $q$, they being freely rotative on the rear-wheel hub $d$ of a cycle and being held in place against lateral movement by collars, as $v$ and $u$, respectively. These sprocket-wheels running loose on the hub $d$ and capable, therefore, of rotation in opposite directions thereon are adapted to be alternately coupled to said hub by a clutch, as $r$.

In Fig. 1 the clutch is shown as occupying its intermediate and ineffective position. Said clutch is shown as consisting of a wheel slidable on the hub and having oppositely-disposed teeth, as $s$, on its faces adapted to enter holes or slots, as $s'$, in the adjacent faces of the sprocket-wheels $p$ and $q$. While the clutch $r$ is freely slidable on the hub $d$, it is rotary therewith, it being seated on a polygonal portion of said hub in a manner similar to the part $d'$ thereof. When the clutch $r$ is connected with wheel $p$, the hub, and consequently the rear wheel (not shown) of the cycle, will be driven through said wheel $p$, which is coupled to the hub, and likewise the wheel $q$ may be coupled to the hub, or both wheels $p$ and $q$ may run free on the hub by moving the clutch $v$ to its ineffective position. (Shown in Fig. 1.) The wheels $p$ and $q$ may be driven by some suitable form of mechanism which I do not deem necessary to show.

I will now describe a simple mechanism for shifting the clutch $r$.

A disk is shown at $j$, it having an annular flange $i$, hereinafter more particularly described. Said disk is shown as fixed, it being conveniently secured in place by being threaded onto the cone $g$, which in turn is threaded onto the axle $c$ and engaged by the nut $h$ on said axle.

A casing $m$ is shown as slidable against the inner face of the annular flange $i$, it having a flange $n$. The wheel $f$ fits in the casing $m$ and slides on the polygonal portion $d'$ of the hub $d$, and this wheel is peripherally grooved. The flange $n$ is removable, it being held in place against the body of the casing $m$ by set-screws $k$, and it and said body therein have complemental portions of a runway or groove to receive the balls $o$, which travel in the peripheral groove in the wheel $f$. As the flange $n$ is removable the balls can be readily put into position by taking the same off. The balls $o$ serve their usual function, that of reducing friction being the rotating wheel $f$ and non-rotating casing $m$, besides serving as a suitable connection between these parts, whereby when the casing $m$ is moved sidewise a corresponding motion through the intermediate balls will be imparted to the wheel $f$, the latter through intermediate means serving to actuate the clutch $r$.

The casing $m$ has a peripheral series of pins $x$ passing through a corresponding member of diagonally arranged slots $a$ in the flange $i$. Said casing $m$ has a button or projection, as $l$, adapted to be connected with suitable hand-actuated means (not shown) by which to turn the casing $m$ in the flange $i$, and as it turns it will be caused to move sidewise, by reason of its pin-and-slot-connection with the flange to thereby correspondingly actuate the wheel $f$, so that the latter can be slid into or out of engagement with either of the wheels $p$ and $q$ or put into its intermediate position, the slots $a$ being made long enough and being so disposed as to secure these results. A plurality of rods are shown at $e$, these passing through suitable holes in the hub inside the sprocket-wheels and being connected, respectively, with the wheel $f$ and clutch $r$.

By moving the clutch $r$ sidewise through the agency of the mechanism hereinbefore described either of the spocket-wheels may be connected to the hub $d$, or when said clutch is in its intermediate position said sprocket-wheels will run idle on the hub, whereby a rider of the cycle provided with the improvements herein described may coast. The wheels $p$ and $q$ are shown as being of different sizes, whereby through suitable sprocket-gearing (not shown) the hub $d$, and consequently the wheel connected therewith, may be driven at a variable speed.

In Figs. 5 and 6 the hub $d^2$ is shown as having but one sprocket-wheel, (denoted by $q'$.) In the construction shown in these figures I have designated parts similar to those hereinbefore described with prime-marks. The wheel $f'$, disk $j'$, and casing $m'$ are constructed and coact precisely like the other parts previously described, except that the clutch means are mounted directly on said wheel $f'$ and consist of a plurality of pins $s'$, adapted to enter holes $s''$ in the adjacent face of the sprocket-wheel $q'$. The clutching means therefore forms a part of the wheel $f'$, and when the latter is moved sidewise in the proper direction by the turning of the casing $m$ the teeth or pins $s'$ enter the holes $s''$ in the sprocket-wheel $q'$, as shown in Fig. 6, so as to connect said sprocket-wheel with its hub. Outward movement from the position shown in Fig. 6 on the part of the wheel $f'$ will uncouple the sprocket-wheel from its hub, so that it may run free thereon, as indicated in Fig. 5.

The driving mechanism forms no part of the present invention. For the purpose, however, of showing the mode of operation of the clutching mechanism I have illustrated it in the drawings, in connection, first, with two driving sprocket-wheels, and, second, with a single driving sprocket-wheel.

The form of the clutching means, the manner of mounting the same on the hub, and other points in construction may be variously modified within the scope of the appended claims.

Having described the invention, I claim—

1. In a device of the class specified, a hub, a driving member rotative on said hub, a fixed disk provided with a flange having diagonal slots, a casing provided with pins entering the slots, a wheel actuated by the casing, and means operative with said wheel for clutching said driving member to the hub.

2. In a device of the class specified, a hub having a polygonal portion, a driving member rotative on said hub, a fixed disk provided with a flange having diagonal slots, a casing surrounded by said flange and having pins entering the slots, a wheel slidable laterally on said polygonal portion, and means for coupling said driving member to the hub, connected with said wheel.

3. In a device of the class specified, a hub, a driving member rotative on said hub, a fixed disk provided with a flange having diagonal slots, a casing coöperative with the flange, and having a removable flange, a wheel rotative with the hub, balls between said wheel and casing, and means for clutching said driving member to the hub, operative with said wheel.

4. In a device of the class specified, a hub, driving members, both rotative on said hub, a clutch member for said driving members rotative with the hub and slidable thereon, a wheel rotative with the hub, rods connected respectively with said clutch member and wheel, and means for positively operating said wheel sidewise.

In witness whereof I have signed this specification in the presence of two witnesses.

ROBERT ALLEN CORDNER.

Witnesses:
ALICE ELIZABETH CORDNER,
ROBERT HENRY CORDNER.